July 16, 1940.  J. BERGER  2,208,286

PIPE COUPLING

Filed Nov. 30, 1937

Inventor:
J. Berger
by: Glascock Downing & Seebold
Attys.

Patented July 16, 1940

2,208,286

UNITED STATES PATENT OFFICE 2,208,286

PIPE COUPLING

Julius Berger, Berlin-Wilhelmsruhe, Germany

Application November 30, 1937, Serial No. 177,351
In Germany January 26, 1937

6 Claims. (Cl. 284—19)

This invention relates to a pipe coupling of the kind in which the two parts of the coupling form the ends of the pipes to be coupled and are provided each with an automatically acting valve which in the uncoupled state is closed and in the coupled state is open.

The demands made on such couplings are manifold. Thus, for instance, a rapid release disconnection and connection of the coupling parts without loss of the medium (liquid, gas or the like) contained in the pipe must be possible, for, should such a loss occur, the coupling would be useless for many purposes. In the conveying network of liquid brakes, for instance, a loss of liquid due to uncoupling would make a refilling of the network necessary, if the brake is to remain effective. On the other hand, a loss of liquid during uncoupling in many cases entails the entry of air when coupling, which must also be avoided, with liquid-filled networks.

Furthermore, such a coupling must be fluid-tight both when in the connected and the disconnected state, this presenting some difficulties, owing to the necessity for the provision of a number of movable parts. Finally, the valves of the two coupling parts are to be nonsensitive to pressure stresses from both directions, so that their effectiveness is assured independently of the direction of flow of the medium contained in the pipe.

Even the above requirements, quite apart from a number of other necessary conditions, are not fulfilled by the hitherto known constructions. The coupling according to the invention, however, fulfills all requirements and occurring working conditions, through the valve members of each pipe end being in the coupled state held open by the abutting members of the other pipe end.

Figure 1:
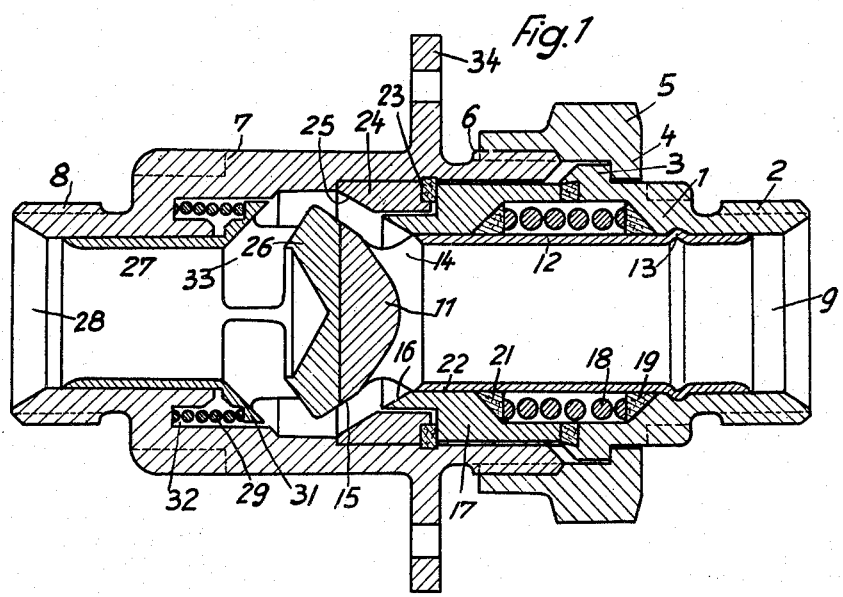

Further features and advantages of the invention will be gathered from the following specification, in which two constructional examples are explained with reference to the accompanying drawing, in which Fig. 1 shows a longitudinal section through one constructional form and Fig. 2 a longitudinal section through the second constructional form.

In the constructional form shown in Fig. 1 only all the parts of the new coupling are shown but not the ends of the pipes. Part 1 forms the end of one pipe which can be connected with it in any suitable manner, for instance through the end of the pipe, being screwed on to the thread 2. At the left-hand end the part 1 is provided with a ring-shaped flange 3, against which an inwardly projecting flange 4 of the union nut 5 can bear. This nut engages at its other end with an internal thread in the external thread 6 of the coupling part 7, which is connected in any suitable manner with the end of the other pipe, for instance by means of the thread 8. The drawing shows the coupling in the coupled state and disconnection is effected by unscrewing the union nut 5. In the bore 9 of the part 1 is the combined abutting and seating member 11 which is provided towards the right with a tubular extension or member 12 which is expanded into an internal ring-shaped groove 13 of the part 1, so that the member 11 is thus rigidly connected with the part 1. Through lateral bores 14 the liquid or the gas can flow out, which fills the bore 9 and the interior of the tubular extension 12.

The member 11 has a ring-shaped valve seat surface 15 on its rear face which is intended to coact with a corresponding surface 16 of the valve closing body 17. This body 17 is in the form of a sleeve or annular member surrounding the tubular extension 12 and is loaded by a spring 18 which also surrounds the tubular extension 12 and bears at one end with a packing ring 19 against the coupling part 1 and at the other end against an inwardly extending projection of the closure body 17, also through the intermediary of a packing 21. The provision of the two packings 19 and 21 is of advantage but is not necessary, for the cylindrical internal surface 22 of the body 17, which bears against the external surface of the tubular part 12, may be fitted so accurately that a good sealing effect is obtained.

In the coupled state, as shown, the valve closure body 17 bears with an external shoulder against a packing 23 which in the form of a sleeve is let into the coupling part 7 and the combined abutting and seating member 24 of this coupling part. The member 24 is rigidly connected with the coupling part 7, being for instance pressed into the latter. The member surface 25 of the valve seating 24 is intended to coact with the inwardly movable valve body 26. The valve body 26 is provided with a tubular extension 27 which slides in the bore 28 of the coupling part 7 and is acted on by a spring 29 which bears against an external flange 31 of the valve body 26 and at the other end against the base of a groove 32 in the coupling part 7. Through lateral bores 33 the liquid or the gas is capable of flowing from the interior of the tubular part 27 around the valve body 26. When the parts 1 and 2 are uncoupled the valve body 26 is held by the spring 29 tightly closed against the seating surface 25 of the member 24.

The coupling part 7 is also provided externally with a ring-shaped flange 34 which makes the coupling easier to handle.

In the coupled state as shown the valve body 26 of the left-hand coupling part is contacted directly by the outer abutting face of the combined abutting and seating member 11 of the other coupling part and is moved to open position and held in opposition to the action of the spring 29 away from its associated valve seating 24. The valve body 17 of the other coupling part 1 is contacted in a corresponding manner by the abutting face of the combined abutting and seating member 24 of the coupling part 7 and is moved to open position and held in opposition to the action of the spring 18 off the seating surface 15 of the member 11. From Fig. 1 it will be seen that in this coupled state the medium with which the pipe network is filled can flow readily through the coupling, so that a rapid, almost eddyless flow is possible. The sliding surfaces of the valve bodies lie outside the reach of the flowing medium and the two springs 18 and 29 are also outside the same. The opened position both of the valve body 26 and of the valve body 17 is maintained in a positive manner, due to the abutting surfaces of the members 11 and 24 which respectively coact therewith so that the pressure of the flowing medium, from whichever side it is applied, has no influence on the position of the movable parts.

On the coupling being disconnected by turning the cap nut 5 to the left, the parts 1 and 7 will gradually move apart, the valve body 17 being displaced under the action of the spring 18 more and more to the left and the valve body 26 being displaced under the action of its spring 32 more and more to the right, until the two valve bodies bear against their seatings. During the whole of this motion all parts remain tight and the final opening of the coupling can only be effected after the closing of the two valves. The reverse takes place when the coupling is connected, that is to say the valves only open after the seating and sealing surfaces have been brought to bear against one another. The tubular member 12 thus has with the parts surrounding it a preliminary sealing effect which entirely excludes the loss of any of the flowing medium. Owing to the circumstance, that the two abutting surfaces of the members 11 and 24 with the respective valve bodies 26 and 17 bearing against each other substantially form an uninterrupted continuation of one another, the closure of both coupling parts will take place at the extreme end, so that any loss of flowing medium is for this reason as well impossible.

Figure 2:
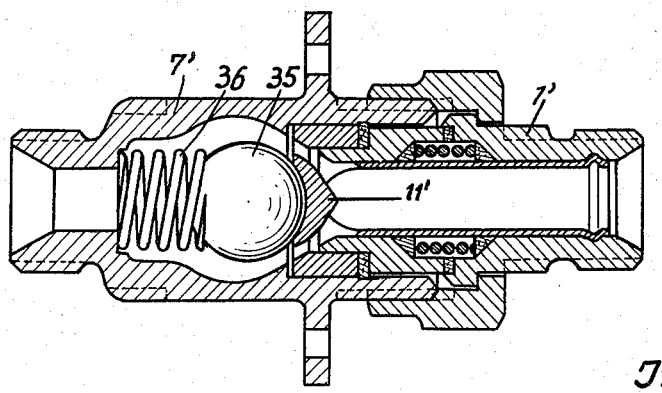

Fig. 2 shows another constructional example which is particularly suitable for small pipe cross-sections, whilst the example shown in Fig. 1 is also useful for the largest pipe cross-sections. In the example shown in Fig. 2 the closing of the coupling part 7' is effected by the ball 35 which in the coupled state bears against the abutting and seating member 11' of the other coupling part 1'. Owing to the use of this ball 35, the spring 36 which actuates the ball cannot lie outside the reach of the flow and the provision of the tubular extension 27 of Fig. 1 is unnecessary in the present constructional example, the other parts of which correspond to those described with reference to Fig. 1.

What I claim is:

1. A pipe coupling, comprising two coaxial body parts, a tubular member firmly affixed in one of the parts and extending therein to the other of said parts, a combined abutting and seating member firmly affixed to the free inner end of said tubular member, an annular valve member surrounding the tubular member in the proximity of said abutting and seating member and seating against the rear face of the latter when the parts are uncoupled, a spring likewise surrounding the said tubular member on the portion thereof between its affixed end and said annular valve member and tending to shift this latter in the direction to the said seating member, another valve member arranged in the other part of the coupling and movable into open position by the abutting member on the coupling of the parts, a combined abutment and valve seating member arranged in the middle portion of said second mentioned part and surrounding the abutting and seating member of the first mentioned part with a gap therebetween and bearing against the valve member of the first mentioned part to move and hold the latter open when the two parts are coupled, and a spring tending to move the valve member in the second part to a seating position against the seating face of the member in this part when the parts are uncoupled.

2. A pipe coupling, comprising two coaxial body parts, a tubular member firmly affixed within one of the parts and extending therein towards the other of the parts, a combined abutting and seating member firmly affixed to the free inner end of said fixed tubular member, an annular valve member surrounding the tubular member in the proximity of said abutting and seating member and seating against the rear face of the latter when the parts are uncoupled, a spring likewise surrounding the said tubular member on the portion thereof between its affixed end and said annular valve member and tending to shift this latter in the direction to the said abutting and seating member, another sleeve shiftable in the other part of the coupling, a valve body firmly attached to this sleeve and being located opposite the abutting and seating member of the first mentioned part of the coupling, another combined abutting and seating annular member fixed in the middle portion of said second mentioned part for abutting the annular valve to open the latter and encircling the first abutting and seating member with a gap therebetween and also forming a seat for the valve body of the second mentioned part, and a spring tending to move the annular valve body in the direction of its seating member.

3. A pipe coupling, comprising two coaxial body parts, a union nut connecting said parts with one another, a tubular member inserted into one of the parts and fixed therein and extending in it in the direction to the other of said parts, a combined abutting and seating member firmly secured to the free inner end of said tubular member, an annular valve member surrounding the tubular member in the proximity of said abutting and seating member and seating against the rear seating surface of the latter when the parts are uncoupled, a helical compression spring encircling the middle portion of the said tubular member and bearing at one end against the first coupling part and at the other end against said annular valve member and tending to shift this latter in the direction to the said abutting and seating member, another valve body in the other part of the coupling, another combined abutting and seating circular member fixed in the middle portion of said second mentioned part for abutting the annular valve to open the latter and encircling the first mentioned abutting and seating of the first mentioned part with a gap therebetween and also forming a seat for the valve body of the second mentioned part, a helical compression spring tending to move this valve body in the direction to this seat, and packing rings for engaging the outer end face and the inner end face of the first-mentioned annular valve member, substantially as set forth.

4. A pipe coupling comprising two detachably connected parts, an inwardly movable spring seated valve normally closing one of the parts when the parts are disconnected, abutment means on the first part, a member fixed in the second part and projecting beyond said part for opening the valve in the first part on the connecting of the parts together and provided with apertures to permit the passage of mediums, and a spring actuated valve member in the second part and surrounding the projecting member for closing the apertures in the projecting member when the parts are disconnected and actuated by and moved into open position by the abutment means of the first part when the parts are connected together.

5. A pipe coupling as claimed in claim 4, in which the rear faces of the projecting member and the abutment means serve as valve seats and in which said abutment means also acts as a main seal when the parts are coupled together.

6. A fluid conduit coupling comprising two separable conduit parts having communicating passages and contacting surrounding portions constituting a main outer seal, a coupling nut for holding said parts together with said portions in fluid sealing relation, valve elements seated in the ends of said conduit parts and having complementary contiguous surfaces of substantially the same diameter as the bore of the conduit to eliminate fluid pockets between said valve surfaces and the main outer seal, the initial application of the coupling nut serving to bring said main seal portions into sealing contact and said valve surfaces into contiguous relation to exclude fluid therebetween, means including an operative connection between said coupling nut and said valve elements to open said valve elements for establishing a passage through said conduit upon further application of said coupling nut, movement of said coupling nut in an opposite direction serving to close said valve elements prior to breaking of said main seal to separate said conduit parts whereby said conduit parts may be coupled and uncoupled without loss of fluid.

JULIUS BERGER.